United States Patent Office 3,355,447
Patented Nov. 28, 1967

3,355,447
TREATMENT OF XANTHOMONAS HYDROPHILIC COLLOID AND RESULTING PRODUCT
John J. O'Connell, San Diego, Calif., assignor to Kelco Company, San Diego, Calif., a corporation of Delaware
No Drawing. Filed Apr. 28, 1964, Ser. No. 363,296
11 Claims. (Cl. 260—209)

This invention relates to improvements in the hydrophilic colloid obtained from *Xanthomonas campestris* and related species and more particularly to a method of improving the stability and clarity of the said colloid, and to the product so obtained.

Xanthomonas hydrophilic colloid is a biosynthetic polysaccharide composed of glucose, mannose, and glucuronic acid in the molar ratio 2:1:1, with approximately each ¼ unit of the polymer containing one acetyl group. It disperses or dissolves in water to give solutions of greatly increased viscosity, and in that respect is similar to some other natural gums. However, the clarity of such solutions is not very great, and the general opacity combined with an off-white to yellowish tinge makes this colloid as ordinarily obtained unsuitable for many applications. Furthermore, the colloid as ordinarily obtained is unduly subject to spoilage when in aqueous solution and it is necessary to use chemical preservatives such as chlorinated phenolic compounds, formaldehyde, and the like. It appears that the spoilage tendencies are associated with the components which cause opacity and off-white coloring.

An object of the present invention is to improve the properties of Xanthomonas hydrophilic colloids so that they will exhibit greatly enhanced clarity, especially in aqueous solutions.

Another object of the invention is to provide a method for treating a Xanthomonas hydrophilic colloid so that it will exhibit greatly enhanced stability and freedom from spoilage when in aqueous solution.

Other objects of the invention will become apparent as the description thereof proceeds.

As a starting material, I employ a Xanthomonas hydrophilic colloid solution and preferably a crude solution thereof known as a beer. A Xanthomonas hydrophilic colloid that is particularly suitable for use in accordance with my invention is such a colloid prepared by the bacterium *Xanthomonas campestris*. The said colloid is a polymer containing mannose, glucose, and potassium glucuronate. In such a colloid, the potassium portion can be replaced by several other cations without substantial change in the property of the said material for my purpose. The said colloid, which is a high molecular weight, exocellular material, may be prepared by the bacterium *Xanthomonas campestris*, by whole culture fermentation of a medium containing 2-5 percent commercial glucose, organic nitrogen source, dipotassium hydrogen phosphate and appropriate trace elements. The incubation time of the final medium is approximately 96 hours at 30° C. aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing *Xanthomonas campestris* hydrophilic colloid, a loopful of organism from the agar slant is adequate for the first stage comprising 200 milliliters of the said glucose medium. In the second stage the material resulting from the first stage may be used together with 9 times its volume of a 3% glucose medium. In the final stage the material produced in the second stage may be admixed with 19 times its volume of the final medium. A good final medium may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. A Xanthomonas colloidal solution in the aforementioned stage of preparation is known as a beer. This is a preferred starting material for practicing my invention and may be used directly from the said fermentation. Alternatively I may filter or centrifuge such a beer to remove any relatively gross by-constituents that may be present as well as the residual bacteria themselves.

While *Xanthomonas campestris* is the bacterium of choice, and the colloid of which I have found to be best, nevertheless related species of Xanthomonas also elaborate a hydrophilic colloid which may be utilized with almost equal success in many instances. Such other species are *Xanthomonas begoniae*, *X. malvacearum*, *X. carotae*, *X. incanae*, *X. phaseoli*, *X. vesicatoria*, *X. papavericola*, *X. translucens*, *X. vasculorum*, *X. hederae*, and others. These are all included in the scope of my invention.

The aqueous hydrophilic colloid solution in the form of a beer will usually have a pH of about 7.0. Such a pH is a desirable pH in the fermentation process. I may treat such a beer by the method of my invention at such a pH. However, I have found it advantageous to adjust the pH of a beer into the range of 8 to 9 by the addition of sodium hydroxide or other alkali, for example, potassium hydroxide, ammonia hydroxide, sodium carbonate, and calcium hydroxide.

In accordance with the method of my invention I heat the aqueous solution of the Xanthomonas colloid to be treated, for example, such a beer to an elevated temperature preferably about 170° F. and hold the beer at such a temperature for a period of about twenty minutes. If this step is carried out at temperatures below 150° F. the holding period will be substantially extended and unduly tie up plant equipment. If the temperature is much higher than 170° F. degradation of the product can result. Following the heating step of my invention I cool the heated beer or other aqueous Xanthomonas colloid solution to a temperature in the range of 40° F. to 100° F. This step is followed by filtration. The concentration of Xanthomonas colloid in the beer of the fermentation step will usually range from 1% to 2% and is usually about 1.5%. The concentration of said colloid should be reduced so as not to exceed 1% prior to the filtration step and preferably about 0.5%. This may be accomplished by diluting the beer either before, during, or after the heating step. It is convenient and expedient to dilute the beer with cold water after heating. This dilution will assist the cooling step and at the same time adjust the gum concentration to the desired level of below 1% prior to the filtration step.

In the event a dry Xanthomonas colloid is treated by the method of my invention the said colloid should first be diluted to form an aqueous solution containing about 1% by weight of the said colloid.

The heated and cooled Xanthomonas colloid solution is preferably filtered with a filter aid such as diatomaceous earth. A number of the commercially available filter aids will increase the pH of the resulting filtrate from the filtering step. It is desirable for minimizing haze in aqueous solutions produced from a Xanthomonas colloid made in accordance with my invention to reduce the pH of the said filtrate to a range of 6 to 7. For such a purpose an acid, such as hydrochloric acid, may be used.

The final product is precipitated from the beer or other aqueous solution thereof by precipitation with alcohol. Suitable alcohols for such a purpose are methyl, ethyl, and isopropyl alcohol. The alcohol should be used in an amount in excess of the water present in the said beer or solution. The preferred alcohol is isopropyl alcohol and I have found a ratio of about 55 parts alcohol to 45 parts water on a weight basis to be effective. Higher amounts of alcohol will increase operation costs. In using methyl or ethyl alcohol, slightly higher amounts are required than when using isopropyl alcohol. The precipitate resulting from the aforementioned alcohol treatment is then preferably dried and milled.

A still further improvement in color of a Xanthomonas colloid produced in accordance with my invention may be accomplished by treating the Xanthomonas colloid solution prior to the filtration step with a bleach solution. Thus, for example, I have successfully used 1% of a 5½% sodium hypochloride bleach solution. In lieu thereof I may use other chlorine type bleach solutions.

The following is an example illustrating my invention.

EXAMPLE

A thousand parts of fermentation liquor resulting from the fermentation process described above and containing about 1½% by weight of a Xanthomonas hydrophilic colloid produced by the bacterium *Xanthomonas campestris* was heated at 170° F. for a period of twenty minutes. The heated liquor was then diluted with water to provide an aqueous solution containing 0.5% by weight of a *Xanthomonas campestris* hydrophilic colloid. The diluted liquor was then cooled to 70° F. The cooled diluted liquor was then filtered using a commercial filter aid sold under the name of Dicalite Speed Flow. The resulting filtrate had a pH of about 9.0. A small quantity of hydrochloric acid was added to the said filtrate to reduce the pH to 6.5.

The final *Xanthomonas campestris* product was then precipitated from the resulting neutral beer or filtrate by the addition of isopropyl alcohol in an amount sufficient to provide an alcohol-water ratio of 55 to 45 on a weight basis. The resulting precipitate was then dried and milled.

To demonstrate the properties of a Xanthomonas colloid treated in accordance with my invention, 1% aqueous solutions of such a colloid both with and without the aforementioned treatment may be prepared. It will be noted that such a solution prepared from the product made in accordance with my invention will remain substantially more stable over a time interval in excess of 100 hours. Thus, for example, a 1% aqueous solution of a *Xanthomonas campestris* hydrophilic colloid prepared without my method dropped from an initial viscosity of 1100 cps. to 8 cps. in 138 hours and in addition developed a very putrid odor. A 1% aqueous solution prepared from a *Xanthomonas campestris* hydrophilic colloid that had been treated in accordance with my invention and having an initial viscosity of 1100 cps. had a final viscosity after 138 hours in excess of 1050 cps. and in addition had no odor at the end of the said 138-hour tests.

In addition to the foregoing, it will be noted that aqueous solutions made from Xanthomonas colloids prepared in accordance with my invention are also more stable at elevated temperatures. In a series of tests made at from 60° C. to 100° C. and at times extending from fifteen to sixty minutes I noted that after 96 hours the solutions made from the products of my invention had essentially the same viscosity and pH and no odor; whereas the solutions prepared from Xanthomonas colloid solutions not treated in accordance with my invention dropped to negligible viscosity; dropped in pH from 7.0 to 5.0; and developed a foul odor.

To further demonstrate the advantages of my invention, comparisons may be made of the relative clarity of solutions made from Xanthomonas colloids treated in accordance with my invention and those not so treated. Comparisons of relative clarity of such solutions when checked in a Model 9 Coleman Nepho-Colorimeter show that products treated in accordance with my invention at 1% concentration will give the same clarity as an untreated colloid at 0.04% concentration.

An improved Xanthomonas hydrophilic colloid resulting from my method may be used in cosmetics such as lotions or shampoos.

While I have described my invention with the aid of various specific ingredients, concentrations, treating conditions, and the like, it will be apparent that within the broad scope of the invention as defined by the claims which follow, I may make numerous variations of detail, working conditions, and the like.

I claim:

1. The process of treating a Xanthomonas hydrophilic colloid to improve the stability thereof which comprises heating an aqueous solution of said colloid having a pH of about 7.0 to 9.0 to an elevated temperature ranging from 150° F. to 170° F. and holding said aqueous solution at said temperature for at least twenty minutes, cooling the heated colloidal solution to a temperature in the range of from 40° F. to 100° F. and adjusting the concentration of said colloid in said solution to an amount not to exceed 1.0% by weight thereof, and filtering the resulting cooled aqueous Xanthomonas hydrophilic colloid solution.

2. The process of claim 1 in which the hydrophilic colloid is a colloid produced by the bacterium *Xanthomonas campestris*.

3. The process in accordance with claim 1 wherein the heating treatment of said aqueous colloid solution is carried out at 170° F. for a period of twenty mintues.

4. The process of claim 1 in which a small quantity of a bleach solution is added to the aqueous Xanthomonas hydrophilic colloid solution prior to the filtration step.

5. The process of claim 1 in which the aqueous solution of a Xanthomonas colloid is a beer produced by the bacterium *Xanthomonas campestris.*

6. The process of claim 1 in which the aqueous solution of a Xanthomonas hydrophilic colloid is adjusted to the range of 8.0 to 9.0 by the addition of an alkali prior to the heating step in said process.

7. The process of claim 1 in which the filtrate resulting from the filtering step is adjusted to a pH in the range of 6.0 to 7.0 by the addition of an acid.

8. The process of claim 1 to which is added the step of recovering the resulting Xanthomonas hydrophilic colloid of improved stability by the step of precipitating said colloid from the aqueous solution thereof by the addition of a lower aliphatic alcohol.

9. The process of claim 8 wherein said lower aliphatic alcohol is isopropyl alcohol.

10. The process of claim 9 wherein the weight ratio of said isopropyl alcohol to said aqueous solution is about 55 to about 45.

11. The product obtained in accordance with the process of claim 1.

References Cited

UNITED STATES PATENTS

| | | | |
|---|---|---|---|
| 2,686,777 | 8/1954 | Wimmer | 195—31 |
| 2,687,368 | 8/1954 | Stoycos | 195—31 |
| 2,798,065 | 7/1957 | Novak et al. | 260—209 |
| 3,232,929 | 2/1966 | McNeely | 260—209 |

OTHER REFERENCES

"New Polysaccharide Gums Produced by Microbial Synthesis," reprinted from Manufacturing Chemist, May 1960, The Leonard Hill Technical Group, Leonard Hill House, Eden St., London, 3 pages.

LEON D. ROSDOL, *Primary Examiner.*

H. B. GUYNN, *Assistant Examiner.*